United States Patent
DePorter et al.

(10) Patent No.: US 6,274,675 B1
(45) Date of Patent: Aug. 14, 2001

(54) PROCESS TO PRODUCE A MULTICOMPONENT ETHYLENE POLYMER COMPOSITION

(75) Inventors: JoEllen DePorter; Lawrence M. Fodor, both of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 08/145,380

(22) Filed: Oct. 29, 1993

(51) Int. Cl.$^7$ ....................................................... C08F 8/00
(52) U.S. Cl. ............................................ 525/194; 525/240
(58) Field of Search ...................................... 525/194, 240

(56) References Cited

U.S. PATENT DOCUMENTS

| | | | |
|---|---|---|---|
| 4,603,173 | 7/1986 | Mack et al. | 525/194 |
| 5,073,598 | 12/1991 | Anzini | 525/193 |

*Primary Examiner*—Michael P. Woodward
(74) *Attorney, Agent, or Firm*—Edward L. Bowman

(57) ABSTRACT

A process to produce a multicomponent ethylene polymer composition is provided. This process comprises: (a) contacting an organic peroxide with at least one post consumer ethylene polymer resin that has a density from about 0.95 to 0.97 grams per cubic centimeter and a melt index from about 0.3 to about 1 gram per ten minutes; and thereafter (b) blending the composition formed in (a) with at least one virgin ethylene polymer resin that has a density from about 0.93 to 0.945 grams per cubic centimeter and a melt index from about 0.01 to about 0.16 grams per ten minutes.

16 Claims, No Drawings

PROCESS TO PRODUCE A MULTICOMPONENT ETHYLENE POLYMER COMPOSITION

BACKGROUND OF THE INVENTION

Closed loop recycling, (i.e. recycling materials for use in their original application) is not a viable alternative for post consumer, high density polyethylene, milk container resins due to, in part, the inability of of these resins to meet FDA regulations for food contact applications. A logical use for post consumer, high density polyethylene, milk container resins is in containers for household and industrial chemicals. However, the physical requirements for these types of containers are much greater than the physical requirements for high density polyethylene, milk container resins. Consequently, solutions to this problem should be found.

Currently, the typical approach is to blend non-virgin resin with a high performance virgin resin. This usually results in a blend with intermediate physical properties. The drawback is that the broadening of the molecular weight distribution resulting from blending these two resins increases the die swell of the blend beyond the desired range.

SUMMARY OF THE INVENTION

It is an object of this invention to provide a process that produces a multicomponent ethylene polymer composition.

It is another object of of this invention to provide a process that produces a multicomponent ethylene polymer composition that is useful in making household and industrial containers.

In accordance with this invention a process to produce a multicomponent ethylene polymer composition is provided. This process comprises: contacting an organic peroxide with at least one post consumer, ethylene polymer resin that has a density from about 0.95 to 0.97 grams per cubic centimeter and a melt index from about 0.3 to about 1 gram per ten minutes; and thereafter blending the above composition with at least one virgin ethylene polymer resin that has a density from about 0.93 to 0.945 grams per cubic centimeter and a melt index from about 0.01 to about 0.16 grams per ten minutes; to form said multicomponent ethylene polymer composition.

These and other objects, features, aspects, and advantages of this invention will become better understood with reference to the following detailed description of the invention and the claims.

DETAILED DESCRIPTION OF THE INVENTION

In general, the multicomponent ethylene polymer compositions of this invention comprise a post consumer, ethylene polymer resin and a virgin ethylene polymer resin.

The post consumer ethylene polymer resins used in this invention have a melt index from about 0.3 to about 1 gram per ten minutes. Preferably, the melt index is from about 0.4 to about 0.9 grams per ten minutes and most preferably from 0.5 to 0.8 grams per ten minutes. If the melt index is substantially below 0.3 grams per ten minutes the resulting resin will exhibit poor processability. If the melt index is substantially more than 1 gram per 10 minutes the environmental stress crack resistance of the resulting blend could be lower than desired. The melt index is determined in accordance with ASTM D-1238.

The post consumer ethylene polymer resins used in this invention have a density from about 0.95 to about 0.97 grams per cubic centimeter. Preferably, the density is from about 0.955 to about 0.965 grams per cubic centimeter. If the density is substantially below 0.95 grams per cubic centimeter then the stiffness of the resulting blend will be too low. The density is determined in accordance with ASTM D-1505.

The virgin ethylene polymer resins used in this invention have a melt index from about 0.01 to about 0.16 grams per ten minutes. Preferably, the melt index is from about 0.05 to about 0.16 grams per ten minutes and most preferably from 0.08 to 0.16 grams per ten minutes. If the melt index is substantially below 0.01 grams per ten minutes the resulting resin will exhibit poor processability. If the melt index is substantially more than 0.16 grams per 10 minutes the environmental stress crack resistance of the resulting blend could be lower than desired.

The virgin ethylene polymer resins used in this invention have a density from about 0.93 to about 0.945 grams per cubic centimeter. Preferably, the density is from about 0.935 to about 0.945 grams per cubic centimeter and most preferably from 0.936 to 0.940 grams per cubic centimeter. If the density is substantially below 0.93 grams per cubic centimeter then the stiffness of the resulting blend could be too low.

If the density is substantially more than 0.945 grams per cubic centimeter the environmental stress crack resistance of the resulting blend could be too low.

The post consumer ethylene polymer resins and the virgin ethylene polymer resins used in this invention can be made by any manner known in the art.

The post consumer ethylene polymer resin is contacted with an organic peroxide before the post consumer ethylene polymer resin is blended with the virgin ethylene polymer resin to produce the multicomponent ethylene polymer composition.

The organic peroxides useful in this invention are those that have decomposition temperatures from about 300 to about 600 degrees Fahrenheit. Preferably, the decomposition temperature is from about 350 to 500 degrees Fahrenheit and most preferably from 400 to 450 degrees Fahrenheit. If the decomposition temperature is substantially less than about 300 degrees Fahrenheit then inadequate crosslinking will occur, resulting in inferior physical and processing properties in the resulting blend. If the decomposition temperature is substantially greater than 600 degrees Fahrenheit then peroxide decomposition will be too rapid to allow efficient crosslinking and the properties of the resulting blend will be inferior. Suitable examples of such organic peroxides are 2,5-dimethyl-1,5-bis(t-butylperoxy) hexane, di-tert-butylperoxide, 2,5-dimethyl-2,5-bis(t-butylperoxy) hexyne-3.

The post consumer ethylene polymer resin can be contacted with the organic peroxide in any manner known in the art. One suitable method for contacting the resin and the organic peroxide is extruding these compounds together. The temperature of the extruder can be from about 300 to about 600 degrees Fahrenheit. Preferably, the extruder's temperature is from about 350 to 500 degrees Fahrenheit and most preferably from 400 to 450 degrees Fahrenheit. If the extruder's temperature is substantially less than about 300 degrees Fahrenheit then the crosslinking reaction will not occur during the resin's residence time in the extruder. If the extruder's temperature is substantially greater than 600 degrees Fahrenheit then the crosslinking reaction will occur too quickly, thereby making flow through the extruder more difficult.

It should be noted that the temperature in the extruder should be substantially the same as the decomposition temperature of the organic peroxide. Preferably, the temperature of the extruder should be within about 20 degrees Fahrenheit of the decomposition temperature of the organic peroxide. However, it is most preferred if the residence time of the resin in the extruder is at least about three times the ½ life of the peroxide at the decomposition temperature.

The amount of organic peroxide to contact with the post consumer ethylene polymer resin is from about 1 to about 1000 parts per million by weight based on the weight of the post consumer ethylene polymer resin. Preferably, from about 10 to about 500 parts per million and most preferably from 20 to 200 parts per million are used in this application.

The post consumer ethylene polymer resin should be contacted with the organic peroxide for a time period and temperature sufficient to cause the decomposition of substantially all of the organic peroxide. Preferably, less than 10 weight percent of the organic peroxide is left after this contacting procedure and more preferably less than 5 weight percent is left.

After the post consumer ethylene polymer resin is contacted with the organic peroxide, it is then blended with the virgin ethylene polymer resin. This blending can be accomplished by any manner known in the art. One suitable method for blending these resins is by extruding these compounds together. The amount of each resin to blend together can vary widely. For example, the weight ratio of post consumer ethylene polymer resin to virgin ethylene polymer resin is from about 99:1 to about 1:99. Preferably it is from about 80:20 to about 20:80 and most preferably it is from 70:30 to 30:70.

The multicomponent ethylene polymer compositions of this invention have a melt index from about 0.2 to about 0.5 grams per ten minutes and a density from about 0.95 to about 0.96 grams per cubic centimeter. These multicomponent ethylene polymer compositions are especially useful as household and industrial chemical containers.

Other components can also be blended with the resins. For example, antifogging agents, antimicrobial agents, coupling agents, flame retardants, foaming agents, fragrances, lubricants, mold release agents, smoke suppressants, and heat stabilizers. Further information on these compounds can be found in Modern Plastics Encyclopedia, 1992, pgs. 143-198.

EXAMPLE

This example is provided to assist a person skilled in the art with understanding this invention. This example is intended to be illustrative of the invention and is not meant to be construed as limiting the scope of the invention.

The following four different methods of peroxide addition were employed in the preparation of the multicomponent ethylene polymer compositions of this invention.

1. Post-consumer ethylene polymer resin pellets and virgin ethylene polymer resin pellets were blended together first and then peroxide was added to the blend. This composition was then passed through an extruder.
2. Peroxide was first added to the post consumer ethylene polymer resin and extruded. This composition was then extruded with a virgin ethylene polymer resin.
3. Peroxide was contacted with the virgin ethylene polymer resin and extruded. This composition was then extruded with the post consumer ethylene polymer resin.
4. Peroxide was contacted with each of the resins separately and then extruded. The separate resins were then blended and extruded together.

The addition of the peroxide involved melt extruding 25 to 50 parts per million by weight of 2,5 dimethyl-2,5-bis(t-butylperoxy)hexane to the appropriate resin in a 2.5 inch extruder. The amount of post consumer ethylene polymer resin used in these blends was 55 weight percent in all cases. The resins used as virgin resin number 1 had densities from 0.947 to 0.95 grams per cubic centimeter and melt indexes from 0.18 to 0.40 grams per 10 minutes. The resins used as virgin resin 2 had a density from 0.936 to 0.940 grams per cubic centimeter and a melt index from 0.08 to 0.16 grams per 10 minutes. The results are presented in Tables 1 and 2.

TABLE 1

The Effects of the Method of Peroxide Addition on the Physical Properties of Post Consumer Resin/Virgin Resin One

| Addition Method | Melt Index (g/10 min) | Density (g/cc) | ESCR[1] (hrs) | Die Swell[2] |
|---|---|---|---|---|
| 50 ppm Lupersol 101 | | | | |
| 1 | 0.29 | 0.9559 | 49 | 40.8 |
| 2 | 0.34 | 0.9566 | 44 | 42.1 |
| 3 | 0.39 | 0.9570 | 51 | 42.6 |
| 4 | 0.36 | 0.9572 | 51 | 42.1 |
| 25 ppm Lupersol 101 | | | | |
| 1 | 0.35 | 0.9559 | 66 | 44.4 |
| 2 | 0.37 | 0.9561 | 44 | 44.1 |
| 3 | 0.39 | 0.9568 | 44 | 42.4 |
| 4 | 0.38 | 0.9569 | 44 | 43.6 |

TABLE 2

The Effects of the Method of Peroxide Addition on the Physical Properties of Post Consumer Resin/Virgin Resin Two

| Addition Method | Melt Index (g/10 min) | Density (g/cc) | ESCR[1] (hrs) | Die Swell[2] |
|---|---|---|---|---|
| 50 ppm Lupersol 101 | | | | |
| 1 | 0.16 | 0.9499 | 304 | 39.0 |
| 2 | 0.19 | 0.9506 | 344 | 40.8 |
| 3 | 0.24 | 0.9512 | 270 | 40.1 |
| 4 | 0.23 | 0.9516 | 308 | 39.5 |
| 25 ppm Lupersol 101 | | | | |
| 1 | 0.25 | 0.9502 | 337 | 41.8 |
| 2 | 0.21 | 0.9506 | 399 | 40.1 |
| 3 | 0.25 | 0.9516 | 145 | 42.6 |
| 4 | 0.21 | 0.9506 | 349 | 39.5 |

[1]Determined in accordance with ASTM D-1693
[2]In percent

The greatest ESCR was achieved by adding the peroxide to the post consumer ethylene resin component and then extruding these components, followed by, extruding this composition with virgin resin number 2. In the case of virgin resin number 1 the method of peroxide addition had substantially no effect on the ESCR of the multicomponent ethylene blend. Consequently, it can be seen that the particular method of addition of the peroxide and the particular resins used in the blending step can have a great effect on the overall process.

It is also apparent from the results that the die swell of the blend was substantially consistent and within the industry standard range of about 41 percent.

That which is claimed is:
1. A process to produce a multicomponent ethylene polymer composition said process comprising:

(a) contacting an organic peroxide with at least one post consumer ethylene polymer resin that has a density from about 0.95 to 0.97 grams per cubic centimeter and a melt index from about 0.3 to about 1 gram per ten minutes; and thereafter (b) blending the composition formed in (a) with at least one virgin ethylene polymer resin that has a density from about 0.93 to 0.945 grams per cubic centimeter and a melt index from about 0.01 to about 0.16 grams per ten minutes;

to form said multicomponent ethylene polymer composition.

2. A process according to claim 1 wherein said organic peroxide is selected from the group consisting of 2,5 dimethyl-2,5-bis(t-butylperoxy)hexane, 2,5 dimethyl-2,5-bis(t-butylperoxy)hexyne-3, di-t-butylperoxide, and mixtures thereof.

3. A process according to claim 1 wherein said organic peroxide is 2,5 dimethyl-2,5-bis(t-butylperoxy)hexane.

4. A process according to claim 1 wherein the amount of said organic peroxide contacted with said post consumer ethylene polymer resin is from about 10 to about 500 parts per million by weight based on the weight of said post consumer polymer resin.

5. A process according to claim 1 wherein the amount of said organic peroxide contacted with said post consumer ethylene polymer resin is from 20 to 200 parts per million by weight based on the weight of said post consumer polymer resin.

6. A process according to claim 1 wherein said post consumer ethylene polymer resin has a melt index from about 0.4 to about 0.9 grams per ten minutes.

7. A process according to claim 1 wherein said post consumer ethylene polymer resin has a melt index from 0.5 to 0.8 grams per ten minutes.

8. A process according to claim 1 wherein said post consumer ethylene polymer resin has a density from about 0.955 to about 0.965 grams per cubic centimeter.

9. A process according to claim 1 wherein said virgin ethylene polymer resin has a melt index from about 0.05 to about 0.16 grams per ten minutes.

10. A process according to claim 1 wherein said virgin ethylene polymer resin has a melt index from 0.08 to 0.16 grams per ten minutes.

11. A process according to claim 1 wherein said virgin ethylene polymer resin has a density from about 0.935 to about 0.945 grams per cubic centimeter.

12. A process according to claim 1 wherein said virgin ethylene polymer resin has a density from 0.936 to 0.940 grams per cubic centimeter.

13. A process to produce a multicomponent ethylene polymer composition said process comprising:

(a) contacting an organic peroxide with at least one post consumer ethylene polymer resin, wherein the amount of said organic peroxide used is from about 1 to less than about 100 parts per million by weight, and wherein said post consumer ethylene polymer resin has a density from about 0.95 to about 0.97 grams per cubic centimeter and a melt index from about 0.3 to 1 gram per ten minutes; and thereafter (b) blending the composition formed in (a) with at least one virgin ethylene polymer resin that has a density from about 0.93 to about 0.945 grams per cubic centimeter and a melt index from about 0.01 to about 0.16 grams per ten minutes;

to form said multicomponent ethylene polymer composition.

14. A process according to claim 13 wherein said amount of said organic peroxide is from about 1 to about 50 parts per million by weight.

15. A process according to claim 14 wherein said amount of said organic peroxide is from about 1 to about 25 parts per million by weight.

16. A process according to claim 15 wherein said virgin resin has a density from about 0.935 to about 0.945 grams per cubic centimeter and a melt index from about 0.05 to about 0.16 grams per ten minutes.

* * * * *